United States Patent [19]
Edwards

[11] Patent Number: 5,848,708
[45] Date of Patent: Dec. 15, 1998

[54] HORIZONTAL BICYCLE STORAGE BRACKET

[76] Inventor: John Lee Edwards, 6822 Red Coach Dr., Huntington Beach, Calif. 92647

[21] Appl. No.: 34,526

[22] Filed: Mar. 3, 1998

Related U.S. Application Data

[63] Continuation-in-part of Ser. No. 802,576, Feb. 19, 1997, abandoned.

[51] Int. Cl.[6] .................................................... A47F 7/00
[52] U.S. Cl. ............................ 211/17; 211/20; 211/117; 248/322; 248/339
[58] Field of Search ............................. 211/17, 20, 113, 211/117; 248/339, 322

[56] References Cited

U.S. PATENT DOCUMENTS

| | | | |
|---|---|---|---|
| 3,872,972 | 3/1975 | Cummins et al. | 211/17 |
| 5,354,035 | 10/1994 | Helgren | 211/18 X |
| 5,460,274 | 10/1995 | Kramer | 211/17 |
| 5,474,189 | 12/1995 | Peterson | 211/17 X |
| 5,664,687 | 9/1997 | Liatti | 211/17 |

*Primary Examiner*—Robert W. Gibson, Jr.

[57] ABSTRACT

A suspended bracket assembly for storing a bicycle in an overhead horizontal position. A suspended support bar combined with two ceiling mounted "J" hooks store a bicycle in a stable horizontal position. The forked end of the support bar holds the handle in the nominal position. The flat side of the storage bracket supports the bicycle weight at the steering post and center tube.

7 Claims, 3 Drawing Sheets

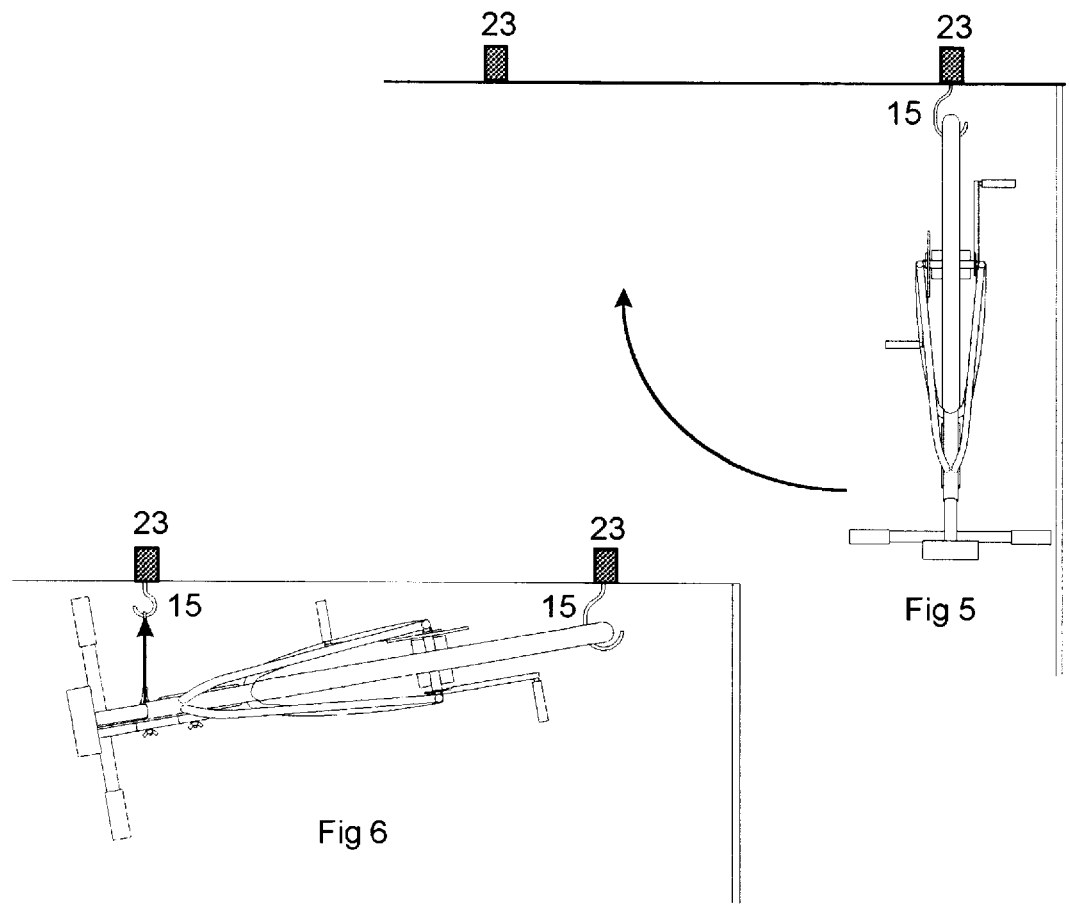
Fig 5
Fig 6
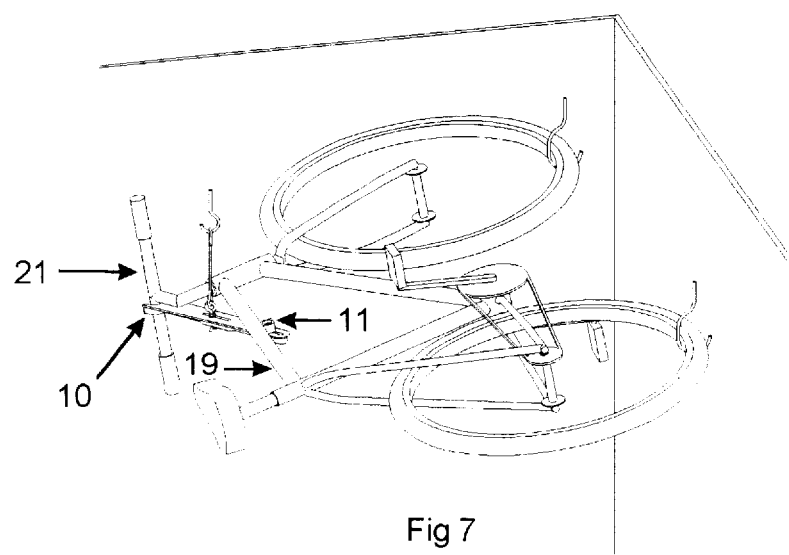
Fig 7

1

HORIZONTAL BICYCLE STORAGE BRACKET

This application is a continuation-in-part of application Ser. No. 08/802,576 filed Feb. 19, 1997, now abandoned.

BACKGROUND OF THE INVENTION

1. Field of the Invention

This invention relates to storage devices.

More particularly, the present patent relates to a bracket for storing a bicycle.

In a further and more specific aspect, the present patent is direct to a bracket for storing a bicycle in a stable overhead horizontal position.

2. Background Art

Bicycles are commonly stored in the vertical position by hanging upside down from the tire rims on two ceiling mounted "J" hooks. Such a storage position provides an excellent storage configuration, but still leaves the bicycle in a position that obstructs normal living space or garage space.

Thereafter, inventor created a support bracket that will allow the bicycle to be rotated horizontally and stored in a stable overhead position.

Accordingly, besides the objects and advantages of suspending the bicycle from the ceiling, several objects and advantages of the present invention are:

(a) rotating bicycle upward towards the ceiling will reduce the possibility of bodily injury which occurs by bumping into the bicycle suspended vertically from the ceiling and (b) rotating the bicycle upward increases unobstructed clearance area beneath stored bicycle for automobiles, if bicycles are stored in garage.

SUMMARY OF THE INVENTION

Accordingly, the reader will see that the horizontal bicycle storage bracket provides an easy and secure method of storing a bicycle in a stable overhead horizontal position. The bicycle tire rims are supported by two ceiling mounted "J" hooks. The bicycle handle bar, steering post and center tube is supported by the suspended storage bracket. The bicycle is initially hung upside down by the tire rims on two ceiling mounted "J" hooks. The bicycle is then rotated to the horizontal position to engage the storage bracket suspended from the ceiling directly above the bicycle steering post. The forked end of the support bar is placed against the handle bar. The frame stop post is slid underneath the bicycle center tube. The flat section of the support bar rests underneath the bicycle steering post and the bicycle center tube. The forked end of the support bracket hold the handle bar and front tire in stable nominal position. In addition, when the bicycle is to be removed, the procedure is simply reversed. The frame stop post is slipped from underneath the bicycle center frame, forked end of the support bar is disengaged from the handle bar and the bicycle is rotated to its vertical position.

BRIEF DESCRIPTION OF THE DRAWINGS

FIGS. 5–7 shows various aspects of the initial installation procedures.

DETAILED DESCRIPTION OF THE PREFERRED EMBODIMENT

Figure 1:
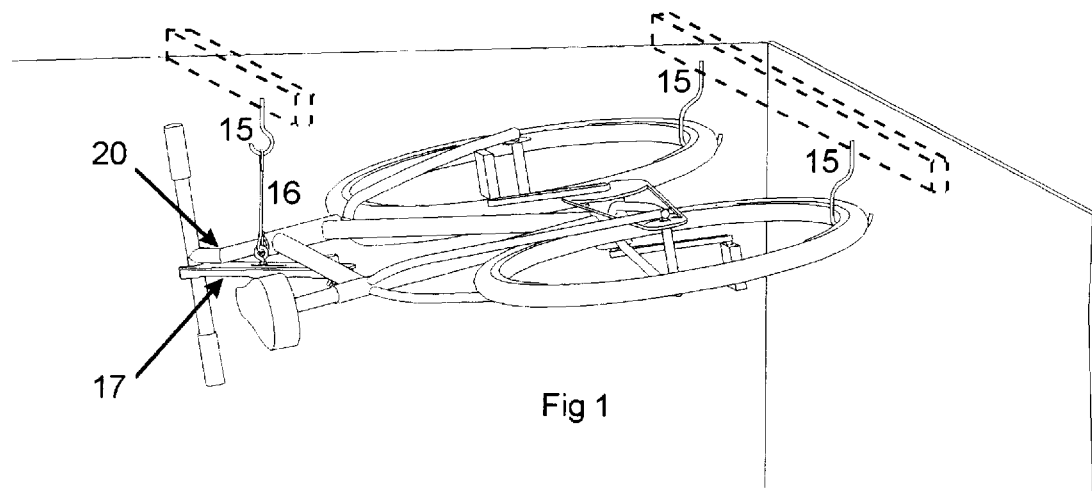
FIG. 1 is a perspective view of a bicycle stored horizontally from a ceiling using the horizontal bicycle storage bracket.

An operational installation of the horizontal bicycle storage bracket is illustrated in FIG. 1. The bicycle tire rims are supported by two ceiling mounted "J" hooks 15. The horizontal bicycle storage bracket 17 is supported by a suspension cord 16 from a third "J" hook 15 mounted directly above the bicycle steering post 20.

Figure 2:
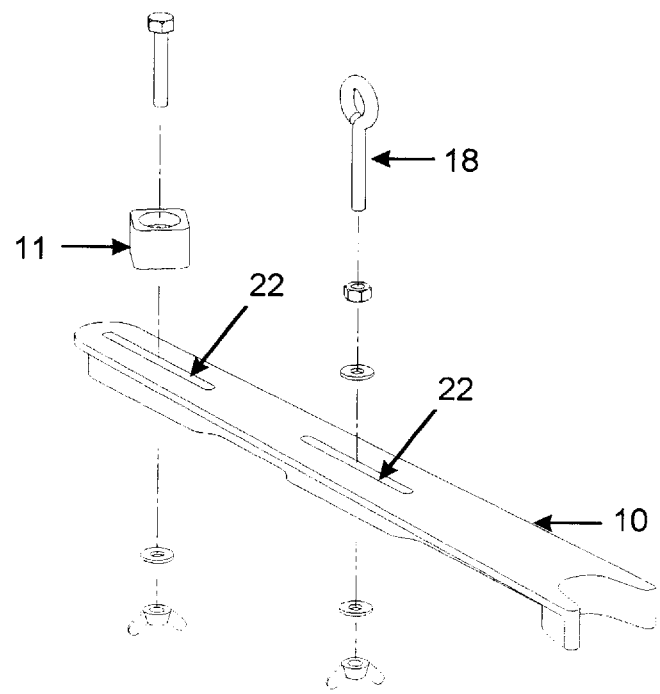
FIG. 2 shows the detail components of the horizontal bicycle storage bracket.

The detailed components of the horizontal bicycle storage bracket are illustrated in FIG. 2. The support bar 10 is a flat tapered bar forked at one end with an adjustable frame stop post 11 fastened at the other end. The support bar 10 is suspended in the middle by a suspension cord attached to an adjustable eye bolt 18. Adjustment slots 22 allow the bracket to be adjusted to fit any bicycle style and size.

Figure 3:
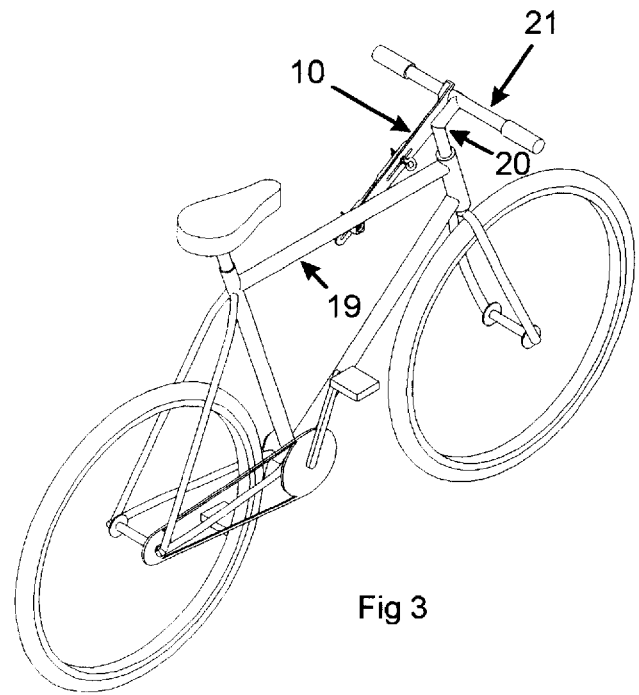
FIGS. 3 & 4 shows the adjustment of the horizontal bicycle storage bracket.
Figure 4:
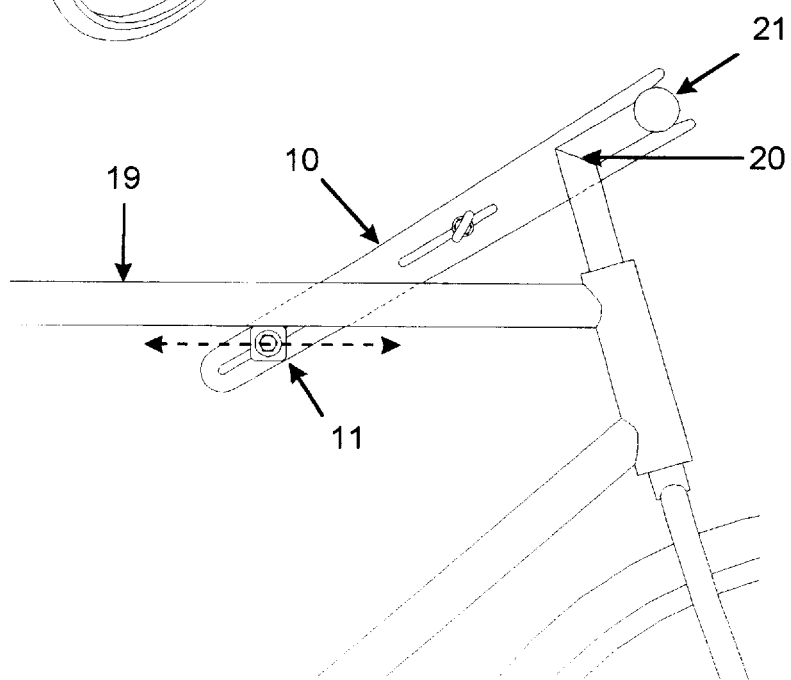

The adjustment of the horizontal bicycle storage bracket to a particular bicycle style and size is illustrated in FIG. 3 and FIG. 4. Position the forked end of the support bar 10 against the handle bar 21. Rest the flat side of the support bar 10 against the center tube 19 and the steering post 20 as shown in FIG. 3. Adjust the frame stop post position to provide the maximum support area against the bicycle steering post 20 as shown in FIG. 4.

The installation of the horizontal bicycle storage bracket is illustrated in FIG. 5 through FIG. 7. Install two "J" hooks 15 in an overhead beam 23. Hang the bicycle upside down by the tire rims from two "J" hooks 15 as shown in FIG. 5. Rotate the bicycle to the horizontal position and install the third "J" hook 15 directly above the steering post as illustrated in FIG. 6. Suspend the horizontal bicycle storage bracket from the third "J" hook. FIG. 7 show the bicycle stored in the operational position. The forked end of the support bar 10 is placed against the handle bar 21 and the frame stop post 11 is slipped underneath the bicycle center tube 19. The bicycle handle bar 21 is held in a stable nominal position by the forked end of the support bar 10. The support bar 10 is locked in position against the bicycle center frame by the frame stop post 11.

Having fully described the invention in such clear and concise terms as to enable those skilled in the art to understand and practice the same, the invention claimed is:

1. A bicycle storage system for storing, horizontally from a ceiling, a bicycle having a front wheel, a rear wheel, a handle bar, a steering post and a center tube, said system comprising: a five point support with first and second support members adapted to engage and suspend the front and rear wheels of said bicycle; a support bar adapted to engage and suspend the bicycle handle bar, the bicycle steering post and the bicycle center tube, said support bar comprising an elongated member having a forked first end and a second end; a flat surface perpendicular to and extending from the forked first end to the second end, a first adjustment slot at the second end, perpendicular to the flat surface; and a second adjustment slot in the center of the elongated member perpendicular to the flat surface.

2. A bicycle, storage system according to claim 1, wherein said forked first end engages the bicycle handle bar and said second end extends past the bicycle center tube.

3. A bicycle storage system according to claim 1, wherein said flat surface engages the bicycle steering post and the bicycle center tube.

4. A bicycle storage system according to claim 1, wherein said first adjustment slot at the second end is adjustably coupled to a frame stop post.

5. A bicycle storage system according to claim 4, wherein said frame stop post engages the bicycle center tube.

6. A bicycle storage system according to claim 1, wherein said second adjustment slot in the center of the elongated member is adjustably coupled to a suspension member.

7. A bicycle storage system according to claim 6, wherein said suspension member depends from said ceiling directly above the bicycle steering post.

* * * * *